United States Patent [19]
Rogers

[11] 3,812,986
[45] May 28, 1974

[54] BOAT TRAILER
[75] Inventor: Richard L. Rogers, Fort Worth, Tex.
[73] Assignee: Texas Royal Manufacturing Company, Fort Worth, Tex.
[22] Filed: Mar. 19, 1973
[21] Appl. No.: 342,415

[52] U.S. Cl................ 214/84, 214/505, 280/414 R
[51] Int. Cl.............................................. B60p 3/10
[58] Field of Search .............. 214/84, 505; 280/414

[56] References Cited
UNITED STATES PATENTS
| 2,828,036 | 3/1958 | White | 214/505 |
|---|---|---|---|
| 3,026,981 | 3/1962 | Youtie | 214/84 X |
| 3,104,770 | 9/1963 | Calkins et al. | 214/84 |
| 3,155,249 | 11/1964 | Johnson | 214/84 |
| 3,225,945 | 12/1965 | Yoder | 214/84 |
| 3,512,667 | 5/1970 | Calkins | 214/505 |

Primary Examiner—Leo Friaglia

[57] ABSTRACT

An open ended cradle type boat trailer in which firm and continuous support is provided to the keel and sides of a boat over an infinite range of boat hull contours during loading, unloading and over-the-road travel. Shock loads imparted to the trailer from over-the-road travel are minimized by a unique multi-part, yieldably connected frame assembly which acts conjointly with the keel and side support structure to minimize and equalize shock loads.

8 Claims, 7 Drawing Figures

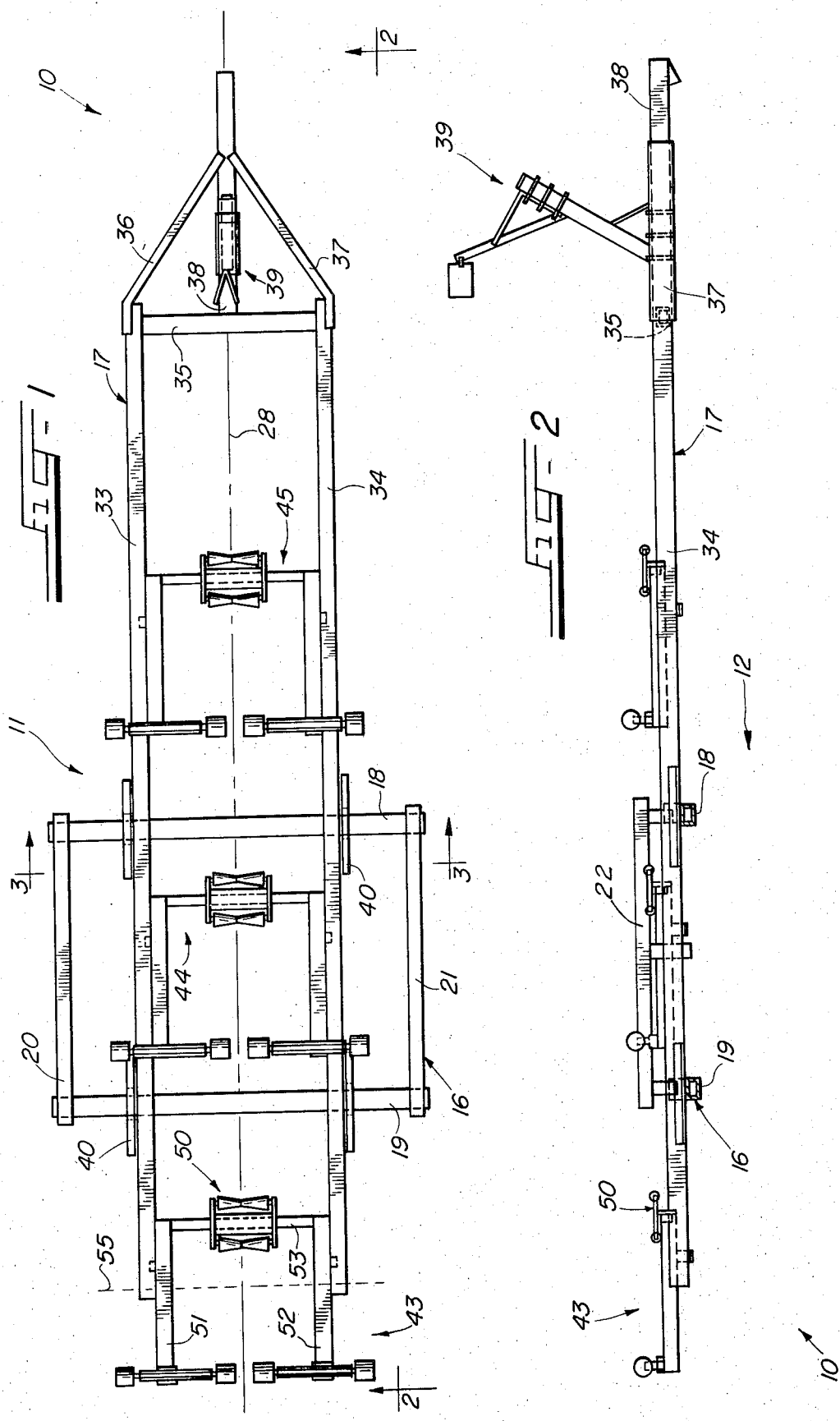

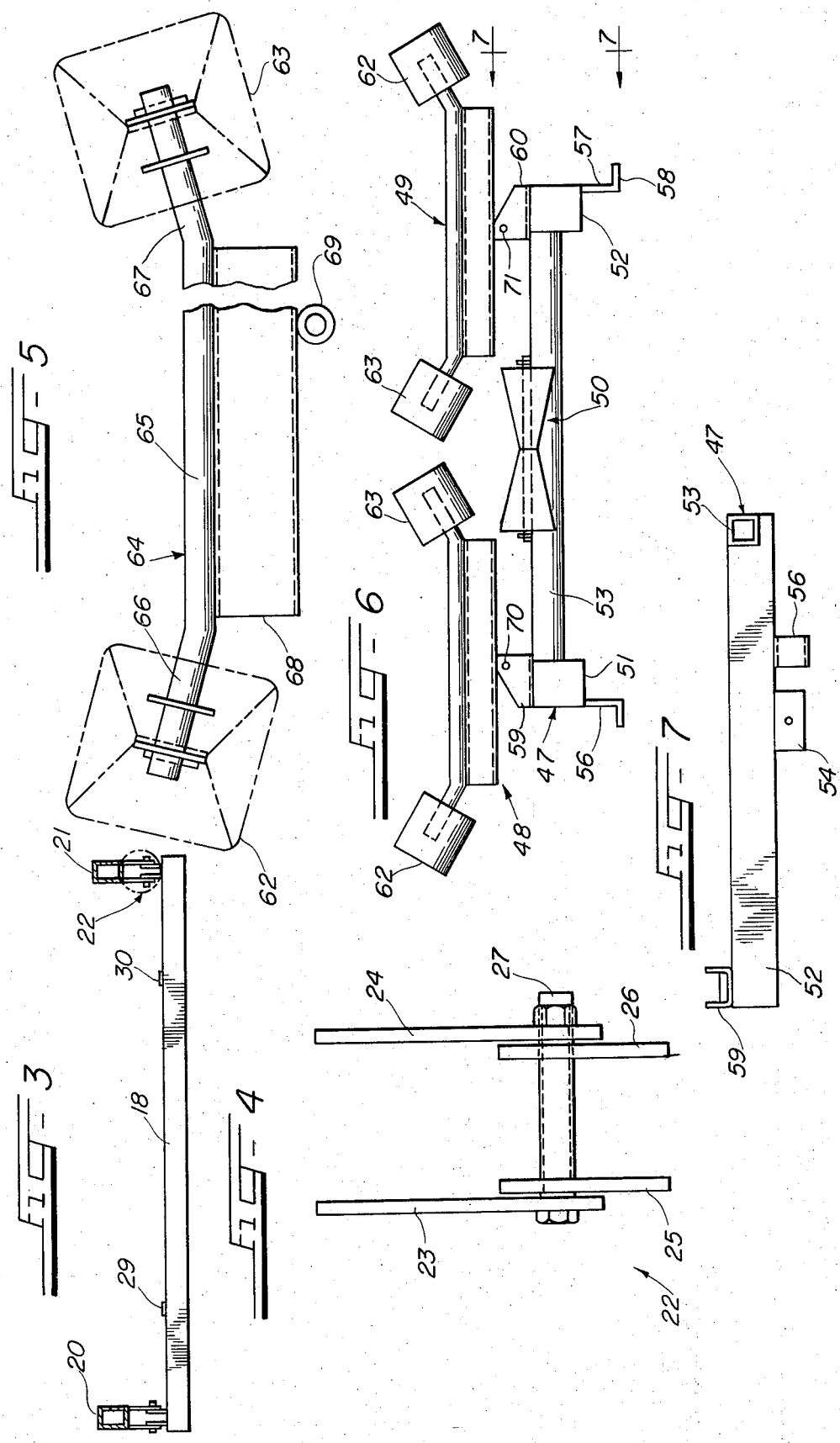

BOAT TRAILER

This invention relates generally to boat trailers and specifically to a moveable cradle type boat trailer in which maximum keel support is provided during loading, unloading and over-the-road travel.

Cradle type trailers, and variations thereon, have been known for many years as illustrated for example in U.S. Pat. No. 2,828,036. It is believed, however, that no cradle type trailer provides firm keel support during loading, unloading and over-the-road travel together with equally firm side support over an infinite range of boat bottom/side contours, together with the advantage of an independently mounted rear cradle frame having an open rear end portion.

Accordingly, a primary object of this invention is to provide a rearwardly open cradle type trailer which provides maximum firm keel support, and equally firm side support, over an infinite range of bottom/side contours during loading, unloading and over-the-road travel.

Another object is to provide a cradle type trailer as above described in which the keel and side support is provided by a plurality of pairs of independently mounted rollers, said rollers being composed of a yieldable material and mounted for rotation around non-parallel, converging axes whereby maximum conformance to varying bottom/side angular relationships is provided.

Yet a further object is to provide a trailer assembly as above described which includes a unique shock absorbing frame construction to thereby minimize shocks imparted to a boat on the trailer during over-the-road travel.

Other objects and advantages of the invention will become apparent from a reading of the following description thereof.

The invention is illustrated more or less diagrammatically in the accompanying figures wherein FIG. 1 is a top plan view of the trailer of this invention;

FIG. 2 is a section view taken substantially along the line 2—2 of FIG. 1;

FIG. 3 is a section through the frame bed taken substantially along the line 3—3 of FIG. 1 with parts omitted for clarity;

FIG. 4 is a detail view to an enlarged scale of a connection between a spring rail and a frame bed cross-member of the frame bed illustrated in FIG. 3;

FIG. 5 is a detail view to an enlarged scale as compared to FIG. 1 of a bottom/side roller assembly;

FIG. 6 is an end view of a cradle assembly; and

FIG. 7 is a side view of the cradle assembly frame taken substantially along the line 7—7 of FIG. 6 with parts omitted for clarity.

Like reference numerals will be used to refer to like parts from Figure to Figure in the following description of the drawings.

Referring first to FIGS. 1 and 2 the boat trailer of this invention is indicated generally at 10, the trailer consisting essentially of a frame assembly, indicated generally at 11, and a conventional wheel and spring suspension system indicated generally at 12.

Frame assembly 11 includes a frame bed, also sometimes hereafter referred to as a sub-frame, indicated generally at 16, at which the wheel and suspension system is mounted (best seen in FIG. 2), and a main frame, indicated generally at 17.

Frame bed 16 includes a front frame bed cross-member 18 and a rear frame bed cross-member 19, left spring rail 20, and right spring rail 21. The frame bed cross-members and spring rails are connected to one another by the connecting means indicated generally at 22 in FIGS. 3 and 4. A pair of spring clips 23, 24 are suitably secured, as by welding, to the underside of the spring rail at one end portion thereof, and a pair of spring hanger mounting plates 25, 26 are suitably secured, as by welding, to the upper side of each frame bed cross-member near an end portion thereof. The spring clips are connected to the spring hanger mounting plates by any suitable fasteners 27 which permit rotational movement of the spring clips, and thereby the spring rails, with respect to the spring hanger mounting plates, and thereby the frame bed cross-members, in a plane generally parallel to the longitudinal axis 28 of the trailer. Each frame bed cross-member carries a pair of frame mounting plates, one pair of which is indicated at 29, 30, for connecting the main frame 17 to sub-frame 16.

Main frame 17 includes left side rail 33, right side rail 34, front cross-member 35, tongue braces 36, 37, tongue 38, and means for receiving and steadying the bow portion of a boat, indicated generally at 39. In this instance a conventional tongue skid assembly has been illustrated. Sub-frame mounting brackets 40 are secured, as by welding, to the side rails for connecting the main frame 17 to the sub-frame 16 by any suitable fasteners, illustrated best in FIGS. 1 and 2.

Main frame 17 carries one or more cradle assemblies. In this instance three assemblies 43, 44 and 45 have been illustrated, and this is the preferred number, but it should be understood that a greater or lesser number may be used depending upon the size of the trailer so long as at least one cradle assembly is provided at the rear end portion of the main frame. For purposes of illustration the cradle assembly 43 will be described in detail.

Cradle assembly 43 includes a roller bracket assembly, indicated generally at 47, and a pair of substantially identical, moveable roller arm assemblies 48, 49, and an auxiliary roller assembly indicated generally at 50.

The roller bracket assembly 47 includes a pair of mounting bracket support members 51, 52, rigidly connected to a cross-member 53, on which the auxiliary roller assembly 50 is mounted. A mounting plate 54 is carried by each support member 51 and 52 for pivotally connecting the cradle assembly to main frame 17 for pivotal movement about an axis 55. A pair of stop members are indicated at 56, 57 for limiting the counter-clockwise movement of the cradle assembly with respect to the main frame, each stop member including a foot portion 58 which engages the underside of its adjacent side rail. Each of the mounting bracket support members 51 and 52 carries a generally U-shaped roller arm mounting bracket as indicated, respectively, at 59, 60.

Since each of roller arm assemblies 48 and 49 are identical only one will be described.

The roller arm assembly includes roller means mounted for freely rotatable movement about the ends of a roller shaft 64. In this instance, the roller means includes a pair of hard rubber rollers 62, 63. As best seen in FIG. 5 the roller shaft 64 includes a center portion 65 and two end portions 66, 67, which are upwardly inclined with respect to center portion 65. It will thus be seen that the rollers rotate about non-parallel axes. In this instance, since the roller shaft end portions 66, 67 have been bent vertically upwardly, the axes of rotation of the rollers are co-planar. The center portion of the roller shaft 64 is secured, as by welding, to a shaft support member 68, which in turn is secured, as by welding, to a roller arm pivot member 69. Any suitable fasteners 70, 71 may be used to connect the roller arm assembly by pivot member 69 to roller arm mounting bracket 59, and thereby to the cradle frame formed by members 51, 52, and 53. It will thus be seen that each roller arm assembly 48, 49 is mounted for movement through an infinite number of positions in a plane substantially transverse to the longitudinal axis 28 of the trailer.

The use and operation of the trailer are as follows.

During loading the trailer is backed down a loading ramp or other surface at the boat launching and removal station in a conventional manner, and the boat aligned as well as possible with longitudinal axis 28 of the trailer. A conventional winch may be employed to pull the boat forwardly onto the trailer.

As the bow of the boat makes initial contact with roller assemblies 48 and 49, the roller assemblies will automatically adjust by rotational movement about the axes of fasteners 70, 71 until each reaches a position in which inner roller 63 makes firm engagement with the keep portion of the boat, and outer roller 62 makes firm engagement with the side of the hull. As the boat is winched onto the trailer the position of each roller assembly 48, 49 may change with respect to its cradle assembly due to the change in contour of the hull. However, at all times inner roller 63 will be in contact with the keel portion of the boat to provide firm support for the keel, and outer roller 62 will be in firm supporting contact with the side of the boat.

During travel, firm multi-point support for the boat is provided by auxiliary roller assembly 50 and roller arm assemblies 48, 49, the two inner rollers 63 providing, in effect, a single keel support point for the keel and the outer rollers 62 providing spaced, transverse support points for the sides of the boat.

Additional cradle assemblies 44 and 45 may be provided as desired, depending upon the length of the boat and trailer.

During over-the-road travel shocks imparted to the wheel and suspension system 12 are cushioned by the unique connecting assemblies 22 which join the frame bed 16 to main frame 17. Transverse road shocks are at least partially absorbed by the spring action of spring clips 23, 24, so the boat is not thrown violently to one side or the other. Shock loads exerted in a longitudinal direction, such as by starting or stopping suddenly, are cushioned at least in part by relative movement between the frame bed 16 and main frame 17 provided by the pivotal fasteners 27.

It will thus be seen that a cradle type trailer has been provided in which firm keel support and side support are provided to the boat hull throughout an infinite range of bottom/side contours during loading, unloading and over-the-road travel. Further, longitudinal and transverse shock loads imparted to the trailer, as from over-the-road travel, are minimized and cushioned to a substantial extent by the unique shock cushioning connection system between the main frame and subframe; this system, acting conjointly with the controlled pivotal movement of the cradle assemblies with respect to the main frame, and the roller assemblies with respect to the cradle assemblies, minimizes and equalizes shock loads to the boat.

It will be understood by those skilled in the art that various modifications may be made without departing from the essential spirit and scope of the invention. For example, the single roller, such as roller 62, mounted at each end of shaft 64 may be replaced by a pair of rollers, said pair of rollers being disposed in longitudinal side by side relation and being pivotable as a unit about an axis coincident or substantially parallel with shaft end portion 66. Accordingly, it is intended that the scope of the invention be limited not by the scope of the foregoing description, but solely by the scope of the hereinafter appended claims when interpreted in light of the pertinent prior art.

I claim:

1. In a boat trailer,
   a frame assembly,
   means carried by the forward end portion of the frame assembly for receiving and steadying the bow portion of the boat, and
   a combination keel and side supporting open ended cradle assembly carried by the rear end portion of the frame assembly, said cradle assembly including roller assembly means arranged to simultaneously support the keel portion and the sides of a boat supported thereon through an infinite range of bottom/side contours said roller assembly means comprising a pair of roller assemblies, one roller assembly located on each side of the longitudinal center line of the trailer, each roller assembly including a mounting shaft assembly, and keel support roller means and side support roller means carried by the mounting shaft assembly, each of said roller assemblies being pivotable in a substantially transverse plane about a substantially longitudinally oriented axis whereby each roller assembly can be oriented into an infinite number of positions within its limits of pivotable movement.

2. The boat trailer of claim 1 further characterized in that
   the roller means in each roller assembly are mounted for rotation about non-parallel axes.

3. The boat trailer of claim 2 further characterized in that
   said roller means in each roller assembly are mounted for rotation about co-planar axes.

4. The boat trailer of claim 3 further characterized in that
   each roller means includes at least one roller,
   each roller having a substantially uniform diameter from end to end.

5. The boat trailer of claim 2 further characterized in that
   said cradle assembly is mounted on said frame assembly for pivotable movement about a transverse axis located intermediate the front and rear end portions of said cradle assembly,
   said roller assemblies being carried by the rear end portion of said cradle assembly,
   and further including auxiliary keel support roller means carried by the front end portion of the cradle assembly, and limit means for limiting the counter-clockwise swing of said cradle assembly with respect to the frame assembly.

6. The boat trailer of claim 1 further characterized in that said frame assembly includes a sub-frame, said sub-frame including a pair of spring rails, a pair of cross-members, and means for connecting the spring rails to said cross-members to form a four-sided, substantially rectangular supporting structure, said connecting means including yieldable connectors which provide relative movement between said spring rails and cross-members, and cushion shock loads transmitted to the sub-frame.

7. The boat trailer of claim 6 further characterized in that said connecting means comprises spring clip means carried by one of said pairs of spring rails and cross-members, hanger mounting plate means carried by the other of said pairs of spring rails and cross-members, and pivot means connecting said spring clip means to said hanger mounting plate means to provide relative pivoting movement therebetween.

8. The boat trailer of claim 7 further characterized in that said pivot means are arranged to provide pivoting movement between the spring clip means and the hanger mounting plate means, and thereby between the spring rails and the cross members, in a plane transverse to the plane of movement in which the spring clip means provides yielding movement.

* * * * *